Jan. 9, 1968

C. J. KLARA 3,362,733

CLAMPING DEVICE

Filed Aug. 16, 1965

INVENTOR
Charles J. Klara

BY Delio and Montgomery
ATTORNEYS

Jan. 9, 1968   C. J. KLARA   3,362,733
CLAMPING DEVICE
Filed Aug. 16, 1965   2 Sheets-Sheet 2

INVENTOR
Charles J. Klara
BY Dello and Montgomery
ATTORNEYS

United States Patent Office 3,362,733
Patented Jan. 9, 1968

3,362,733
CLAMPING DEVICE
Charles J. Klara, Seymour, Conn., assignor to
Farrel Corporation, Ansonia, Conn.
Filed Aug. 16, 1965, Ser. No. 479,989
6 Claims. (Cl. 287—52)

ABSTRACT OF THE DISCLOSURE

This disclosure relates to a clamping device which comprises a housing member having a cylindrical internal surface and end walls having apertures therethrough adapted to receive a shaft through said apertures. An annular clamping member is received within the housing and adapted to receive a shaft therethrough. The clamping member defines with the cylindrical inside wall and end walls of the housing an annular cavity. Positioned within and filling this annular cavity is an inelastic ring member which is encompassed within a mass of resilient material which is cast thereabout and bonded to the exterior surface of the ring member. The mass of resilient material is formed in the shape of and fills the annular cavity so that, upon introduction of fluid between the ring-like member and the material, an expansible chamber is defined and the material forces the clamping member to contract about and clamp upon the shaft therethrough.

This invention relates to clamping devices, and more particularly relates to apparatus for clamping and locating a member in a given position along the length of a shaft.

A clamping device embodying the invention may have many applications, and has been found to be particularly adaptable in clamping a member in a predetermined position on a guide rod or shaft. Accordingly, the invention will be disclosed in such environment.

Presently known techniques of holding two members in predetermined spaced relationship against forces tending to separate the members include tie bars or guide rods extending through the members and having means mountable thereon to prevent movement of the members on the bars or rods. In some cases, the rods may be grooved or otherwise indented to receive locking retainers therein. However, these and other presently known retaining means allow at best only a plurality of finite relative positions of the members. Further, such arrangements may be awkward and slow to manipulate to initially lock the members in a predetermined position and subsequently unlock them from a predetermined position.

In view of these presently known clamping means and the deficiencies thereof, the present invention is intended to provide new and improved shaft gripping or clamping means which is effective to quickly lock a member in a given position on a shaft and is capable of infinite adjustment in position along the length of the shaft.

Briefly stated, the invention in one form thereof comprises a cylindrical housing member or means defining a shaft receiving passage therethrough. A generally cylindrical member is positioned in said housing member and adapted to closely fit about a shaft extending therethrough. The housing member and sleeve member define an annular cavity which accepts a fluid actuated load cell. The load cell comprises a ring-like member having cast thereabout a flexible material such as rubber which is bonded to all surfaces of the ring-like member except the inner peripheral surface. A passage is defined in the ring-like member to admit fluid under pressure into a chamber defined by the ring-like member and the unbonded surface of the flexible material. The cell is defined by the exterior surfaces of the molded flexible material which in an unexpanded condition is substantially the shape of and fills the cavity. When fluid under pressure is admitted into the chamber, the chamber is expanded exerting a compressive force on the clamping member which very tightly grips the shaft and locks the clamping device thereon. Therefore, a member attached to or mounted on the gripping device is securely locked in a given position on the shaft. This construction reduces the time involved in clamping and unclamping the member to the shaft. Additionally, the range in which the member may be clamped to the shaft is infinite.

Accordingly, it is an object of this invention to provide a new and improved clamping device.

Another object of this invention is to provide a new and improved device which clamps onto a shaft or rod to hold a member in a given position on the shaft and resist large forces tending to move the member on the shaft.

Another object of this invention is to provide new and improved clamping means for clamping and locking a member on a shaft or rod in predetermined relation to a second member so as to resist any force tending to separate the first and second members.

A further object of this invention is to provide a new and improved shaft clamping apparatus which may be rapidly actuated both to release and lock a member in a predetermined position on a shaft or rod.

The novel features comprising the invention are particularly pointed out and distinctly claimed in the claims appended to and forming a portion of this specification. The invention, however, both as to its organization and operation, together with further objects and advantages thereof, may best be appreciated by reference to the following detailed description taken in conjunction with the drawings in which:

Figure 1:
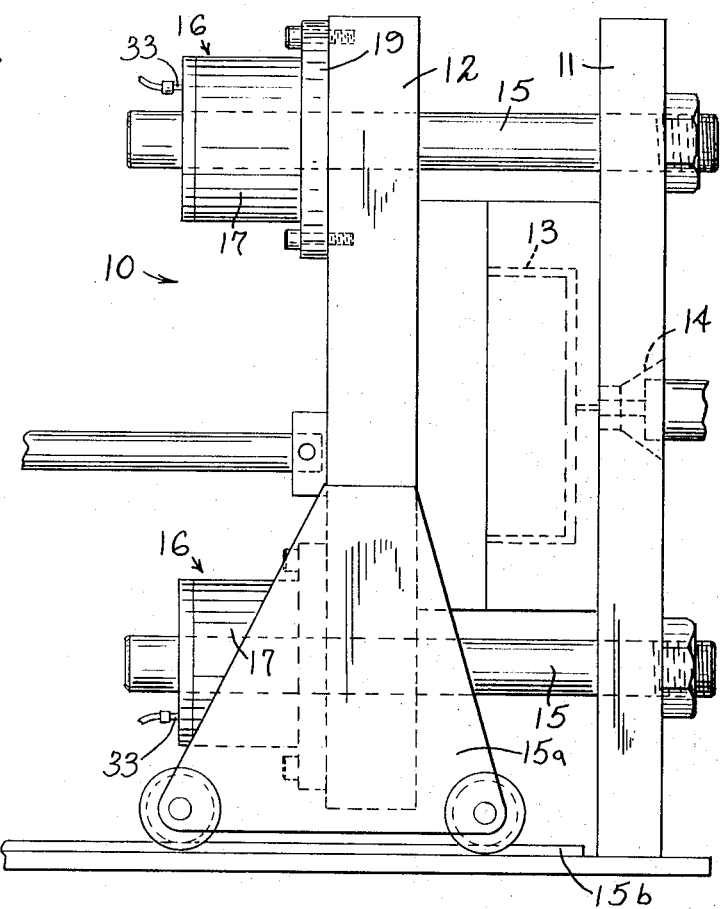
FIG. 1 is a side elevational view of essential portions of injection molding apparatus including clamping devices embodying the invention.

The essential portions of an injection molding machine 10 are shown in FIG. 1 and comprise a stationary platen 11 and a movable platen 12. Mounted to platen 11 is one section of a mold indicated in broken line and designated 13 and mounted to the movable platen 12 is the other portion of mold 13. Defined in platen 11 is a port 14 to receive an injection nozzle to inject material under high pressure into the cavity defined by mold 13. Movable platen 12 moves with respect to stationary platen 11 on a plurality of tie bars or rods 15 and a carriage 15a movable on rails 15b. Mounted to movable platen 12 are clamping devices 16 embodying the invention which clamp and grip the tie rods 15 and predetermine the position of platen 12 with respect to platen 11.

Briefly, the operation of the device of FIG. 1 is as follows: Platen 12 is urged toward platen 11 to close the sections of mold 13 by apparatus such as the piston of a hydraulic cylinder (not shown) so that the mold sections are engaged under high pressure. Then the clamping devices are actuated to clamp and lock movable platen 12 in this predetermined position with respect to platen 11. Thereafter an injection nozzle injects material in a plastic state into the cavity in the mold or die 13. Thereafter, the clamping devices are released, movable platen 12 is moved to the left, as viewed in FIG. 1 to open the sections of mold 13 and the molded article is removed. Then the above described cycle may be repeated. From time to time the molds 13 between the platens may be changed and the dimensions between platens 11 and 12 when in a molding positions will change. Therefore, the clamping or locking devices 16 must be adaptable to grip the tie rods 15 in any position thereon. Moreover, to decrease the overall cycle time required in molding an article, the clamping devices must be quickly actuated and quickly releasable.

Figure 2:
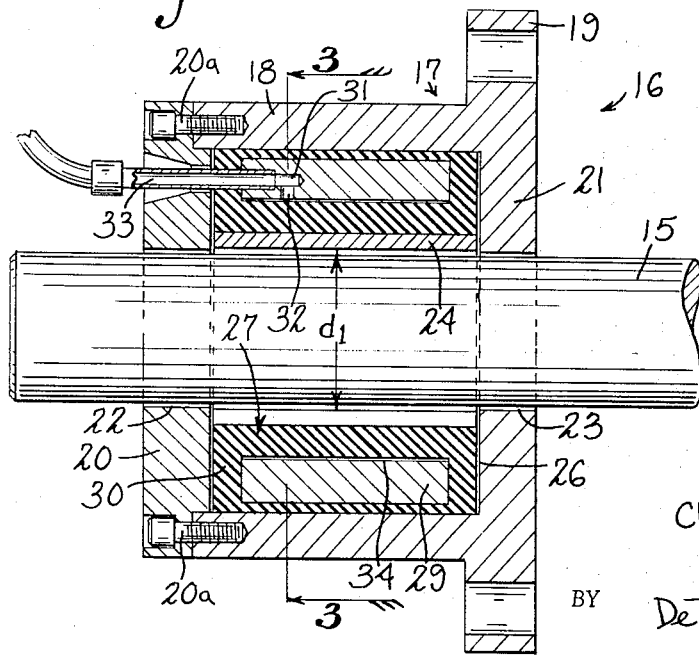
FIG. 2 is a half section in elevation of a clamping device of FIG. 1.
Figure 3:
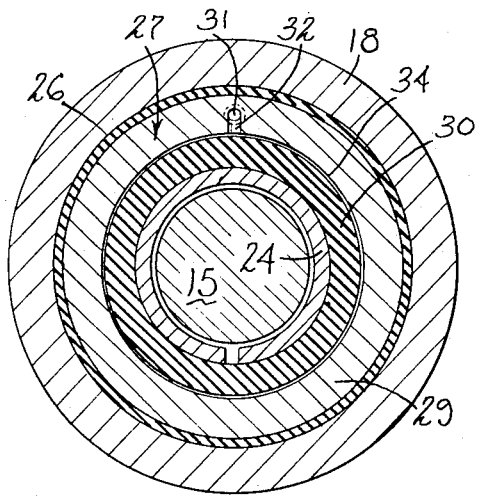
FIG. 3 is a view of the clamping device of FIG. 2 seen in the plane of line 3—3 of FIG. 2.

A clamping or gripping device constructed in accordance with the invention is more clearly shown in section in FIG. 2, and comprises a housing means in the form of member 17 having a cylindrical portion 18, mounting means in the form of an annular flange 19 and an end closure member 20 secured to cylindrical portion 18 by means of a plurality of countersunk bolts 20a threadably received in cylindrical portion 18. The housing member 17 further comprises an integral end portion 21 which extends into the mounting flange 19. Defined in each of end members 20 and end portion 21 are circular apertures preferably coaxial with shaft 15. Apertures 22 and 23 define a shaft receiving passage through clamping device 16.

Disposed within housing means 17 is a clamping member 24 in the form of a split sleeve having an inside diameter $d_1$ only slightly greater than the diameter of shaft 15. It will be understood that the clamping member 24 may be of any suitable configuration such as a split sleeve, as illustrated, or in the form of a two-piece cylinder, or a plurality of elongated segments arranged to be compressed against the shaft. Sleeve member 24 together with the housing means define an annular ring-like cavity 26. Disposed within and filling cavity 26 is a fluid actuated load cell 27 including a rigid ring-like restraining member 29. Molded about restraining member 29 in the shape of cavity 26 is a flexible material 30 such as rubber. In the illustrated embodiment of the invention the rubber is bonded to the outer peripheral surface and the end surfaces of member 29, but is unbonded to the inner peripheral surface of member 29. In constructing load cell 27, the member is tapped and counterbored to provide an inlet conduit 31 and port 32 then drilled to provide communication with conduit 31. A suitable fitting or fluid conduit 33 is inserted into the counterbored conduit and the restraining ring is suspended in a mold of predetermined size. Flexible material, such as rubber, then is introduced into the mold and cast about the restraining ring. Prior to introduction of the rubber, however, the restraining ring is coated on its inner peripheral surfaces with a suitable coating to prevent bonding of the flexible material thereto. Upon completion of this operation a generally cylindrical expansible chamber 34 is provided between the inner peripheral surface of the restraining ring and the flexible material. In a relaxed position of the cell, the chamber 34 has essentially no volume, inasmuch as the flexible material relaxes against the inner surface of member 29.

Figure 4:
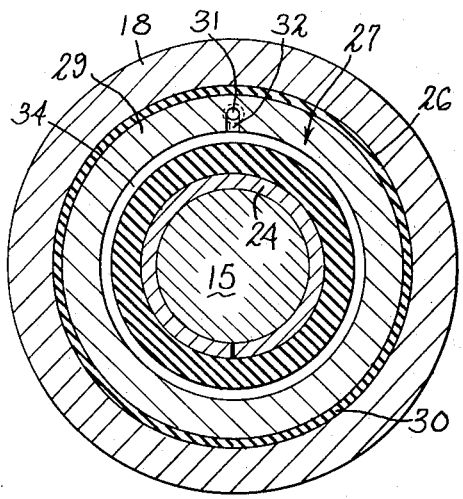
FIG. 4 is a view similar to FIG. 3 but showing the relationship of the elements of the load cell clamping device when the cell is actuated by a fluid to place it in a clamping position.

When fluid under pressure is introduced through conduit 33 and port 32 into the expansible chamber, the chamber is expanded under the pressure of the fluid. Such expansion of the chamber, as more clearly shown in FIG. 4, moves the flexible material inwardly on and about sleeve 24, reducing the diameter thereof and closing the split therein. As sleeve 24 contracts and closes the split it tightly grasps shaft 15 and compressibly engages thereon.

The clamping device is now securely clamped or locked on shaft 15 and thereby locks in a predetermined position with respect to shaft 15 the member on which it is carried, member 12, as exemplified in FIG. 1. When it is desired to release the clamp the fluid pressure applied to the expansible cavity is relieved, and the elasticity of the material comprising cell 27 aids in emptying fluid from the chamber.

When the pressure is relieved sleeve 24 will assume its normal position having an inside diameter $d_1$ as shown in FIG. 2. The dimension $d_1$ need only be of a magnitude sufficient to allow the device to be moved on shaft 15 when the cell is not actuated.

Inasmuch as the cell essentially fills the cavity provided therefor and is of an incompressible or essentially incompressible material, expansion of the chamber is only in a direction to compress the clamping element against a shaft therethrough. The clamping element in a relaxed position fits very closely about a shaft therethrough. Therefore, only a relatively small amount of fluid must be introduced in the expansible chamber to actuate the clamping device, with the result that very high clamping pressures may be rapidly achieved.

Figure 5:
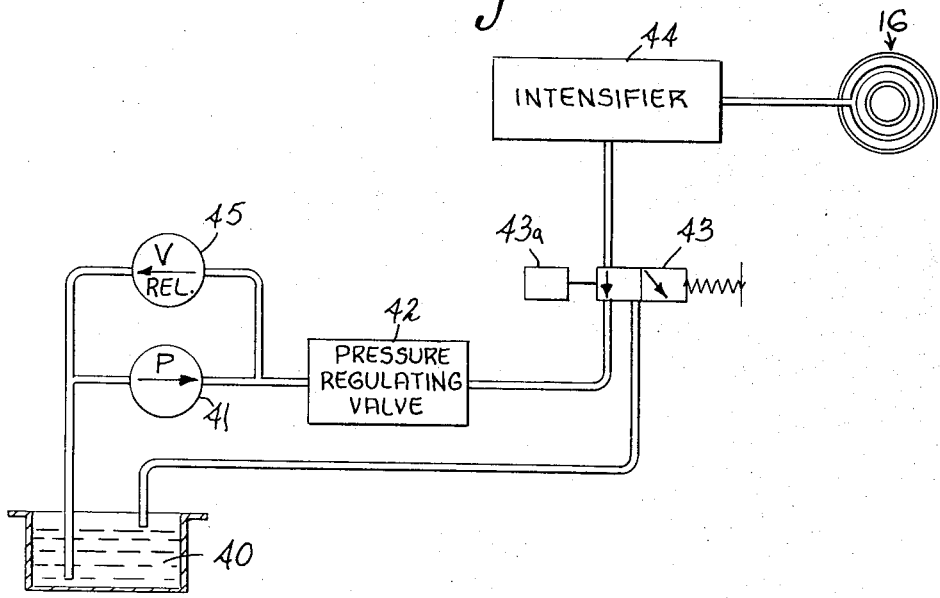
FIG. 5 is a schematic diagram of a hydraulic system which may be utilized to actuate the disclosed clamping devices.

Fluid may be applied to the load cell from any suitable source of fluid pressure, many of which are well known in the art. FIG. 5 schematically illustrates a suitable hydraulic system which comprises a source of fluid 40, a pump 41, pressure regulating valve 42, bi-directional valve 43, a hydraulic intensifier 44 and a pressure relief valve 45 in a well known arrangement. In operation, pump 41 draws the hydraulic fluid from source 40, the pressure thereof is regulated at valve 42 and applied through valve 43 to the intensifier which amplifies the pressure and applies it to one or more clamping device 16. Valve 43 is operated by solenoid 43a which when actuated will relieve the pressure applied to the intensifier 44 and return the hydraulic fluid to source 40. It will, of course, be understood that a hydraulic system as shown in FIG. 5 may be utilized to actuate a plurality of clamping devices, as used in the machine of FIG. 1.

It may thus be seen that the objects of the invention set forth above as well as those made apparent from the foregoing description are efficiently attained. Other embodiments of the invention and modifications to the disclosed embodiment thereof which do not depart from the spirit and scope of the invention may occur to others skilled in the art. Accordingly, the appended claims are intended to cover all modifications and embodiments of the invention which do not depart from the spirit and scope thereof.

What is claimed is:

1. A clamping device comprising an annular housing member having a cylindrical inner surface, an inelastic annular ring having a lesser outside diameter than said inner surface within said housing member, a sleeve within said housing member having a slot along its length, said sleeve adapted to closely fit about an object received therein, an expansible material within said housing, said expansible material filling said housing between said sleeve and said inner surface and encompassing said ring, said material being bonded to the outer surface of said ring, and means for applying fluid pressure between the inner surface of said ring and said expansible material to expand said material and contract said sleeve, said housing member having end walls confining said material therein.

2. A clamping device comprising an annular housing member having a cylindrical inner surface, an annular ring within said housing member having a lesser outside diameter than said inner surface, a clamping member within said housing member adapted to closely fit about a shaft received therein, an expansible material within said housing, said expansible material filling said housing between said clamping member and said inner surface and encompassing said ring, said material being bonded to the outer surface and edges of said ring, and means for applying fluid pressure between the inner surface of said ring and said expansible material to expand said material and force said clamping member into clamping engagement with a shaft therethrough, said housing member having end walls confining said material therein.

3. A clamping device comprising an annular housing member having a cylindrical inner surface, an annular ring of lesser diameter than said inner surface within said housing member, a sleeve within said housing member and said ring having a slot along its length, said sleeve adapted to closely fit about a shaft received therein, and an expansible material filling said housing between said inner surface and said sleeve, said expansible material encompassing said ring and being bonded to the outer surface of said ring, and means for applying fluid pressure between the inner surface of said ring and said expansible material, said housing member having end walls to confine said material therein.

4. A clamping device comprising an annular housing member having a cylindrical inner surface, said housing member having end walls with apertures therein to receive a shaft therethrough, an annular ring within said housing member having an outer surface of lesser diameter than said inner surface, a sleeve within said housing member having a slot along its length, a shaft receivable through said sleeve, said sleeve adapted to closely fit about said shaft, a resilient material filling said housing between said inner surface and said sleeve, said expansible material encompassing said ring and being bonded to the outer surface and edges of said ring, said end walls confining said material in said housing means for applying fluid pressure between the inner surface of said ring and said expansible material to expand said material and contract said sleeve, and means for mounting said housing member to an object to be located on said shaft.

5. Apparatus for clamping a shaft, comprising a housing member having a passage defined therethrough adapted to receive a shaft therein, a clamping member within said housing arranged to fit about a shaft extending through said passage, said housing member and said clamping member defining an annular cavity therebetween, an expansible cell in said cavity comprising an annular ring-like member of lesser outside diameter than the inside diameter of said housing member, a mass of elastic material molded about said ring-like member and bonded thereto on the outer surface thereof so as to define an expansible chamber therebetween, said elastic material being molded in the shape of and filling said cavity, said housing member having end walls confining said material therein and means for applying fluid under pressure to said chamber to cause expansion thereof and contract said clamping member.

6. A stationary member having a plurality of tie rods extending therefrom, a movable member having openings therein to receive said tie rods therethrough, a plurality of clamping devices carried on said movable member each comprising a housing means having a passage defined therethrough adapted to receive a tie rod therein, a clamping member filling said housing arranged to loosely fit about a tie rod extending through said passage, said housing means and said clamping member defining a cavity therebetween, an expansible cell in said cavity comprising an annular ring-like member of lesser outside diameter than the inside diameter of said housing member, a mass of elastic material molded about said ring-like member and bonded thereto except on the inner surface thereof so as to define an expansible chamber therebetween, said mass of elastic material filling said cavity, said housing member having end walls confining said material therein and means for applying fluid under pressure to said chambers of each of said clamping devices to cause expansion thereof and contract said clamping members about associated tie rods.

References Cited
UNITED STATES PATENTS
2,465,848  3/1949  Collins et al. _____ 285—96
2,999,382  9/1961  McClelland _____ 73—93

FOREIGN PATENTS
550,948  2/1943  Great Britain.

CARL W. TOMLIN, *Primary Examiner.*
W. L. SHEDD, *Assistant Examiner.*